United States Patent
Fuqua et al.

(10) Patent No.: US 7,650,095 B2
(45) Date of Patent: Jan. 19, 2010

(54) TRACKING USAGE OF A FUNCTIONAL UNIT

(75) Inventors: Charles L. Fuqua, Boise, ID (US); Gerold K. Shelton, Meridian, ID (US); Curtis R. Gold, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 243 days.

(21) Appl. No.: 11/125,019

(22) Filed: May 9, 2005

(65) Prior Publication Data

US 2006/0251442 A1    Nov. 9, 2006

(51) Int. Cl.
  *G03G 15/00* (2006.01)
(52) U.S. Cl. ............................................... 399/80
(58) Field of Classification Search .................. 399/79, 399/80; 340/5.61, 5.81; 705/18, 28, 29, 705/30
  See application file for complete search history.

(56) References Cited

U.S. PATENT DOCUMENTS

| | | | |
|---|---|---|---|
| 5,959,530 A * | 9/1999 | Lupien et al. ............ 340/568.1 |
| 6,379,058 B1 | 4/2002 | Petteruti et al. |
| 6,409,401 B1 | 6/2002 | Petteruti et al. |
| 6,498,912 B1 * | 12/2002 | Leni et al. .................... 399/79 |
| 6,507,716 B2 * | 1/2003 | Nomura et al. ............... 399/80 |
| 6,694,115 B2 * | 2/2004 | Weaver ......................... 399/80 |
| 6,784,789 B2 | 8/2004 | Eroglu et al. |
| 6,808,255 B1 | 10/2004 | Haines et al. |
| 6,819,446 B1 * | 11/2004 | Ogawa et al. .............. 358/1.15 |
| 6,827,279 B2 | 12/2004 | Teraura |
| 6,846,056 B2 | 1/2005 | Jacobsen et al. |
| 6,944,428 B2 * | 9/2005 | Hagiwara et al. .......... 455/66.1 |
| 7,079,008 B2 * | 7/2006 | Castle et al. ................ 340/10.1 |
| 7,171,135 B2 * | 1/2007 | Nishizawa et al. ............ 399/70 |
| 2003/0206311 A1 | 11/2003 | Konsella et al. |
| 2004/0125397 A1 * | 7/2004 | Adkins et al. .............. 358/1.14 |
| 2005/0185216 A1 * | 8/2005 | Mitsuhashi et al. ........ 358/1.15 |
| 2005/0191077 A1 * | 9/2005 | Nishizawa et al. ............ 399/80 |
| 2006/0065720 A1 * | 3/2006 | Asako et al. ................. 235/382 |
| 2006/0198653 A1 * | 9/2006 | Plewnia et al. ................ 399/79 |
| 2007/0079363 A1 * | 4/2007 | Itoh .............................. 726/5 |

FOREIGN PATENT DOCUMENTS

| | | | |
|---|---|---|---|
| JP | 09168066 A | * | 6/1997 |
| JP | 2000321938 A | * | 11/2000 |
| JP | 2001092620 A | * | 4/2001 |
| JP | 2001334735 A | * | 12/2001 |
| JP | 2002341703 A | * | 11/2002 |
| JP | 2005084440 A | * | 3/2005 |

\* cited by examiner

*Primary Examiner*—Robert Beatty

(57) ABSTRACT

An image forming system for receiving an identification signal from a first identification tag, identifying a user associated with the first identification signal, and storing information that tracks usage of a functional unit by the user are disclosed.

32 Claims, 3 Drawing Sheets

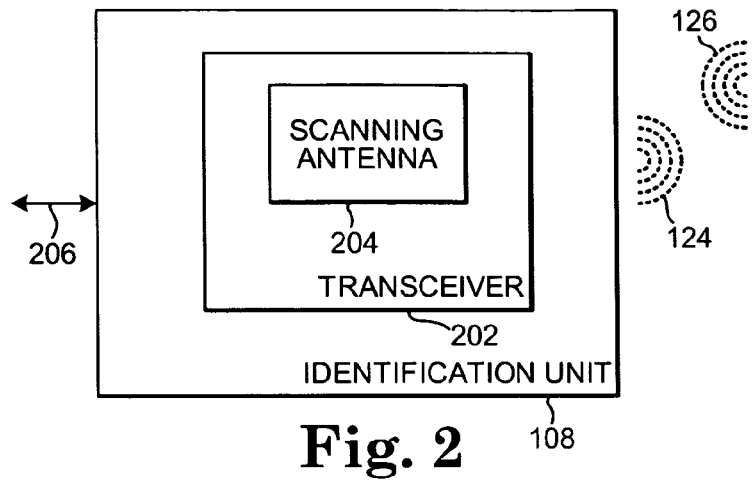
Fig. 2
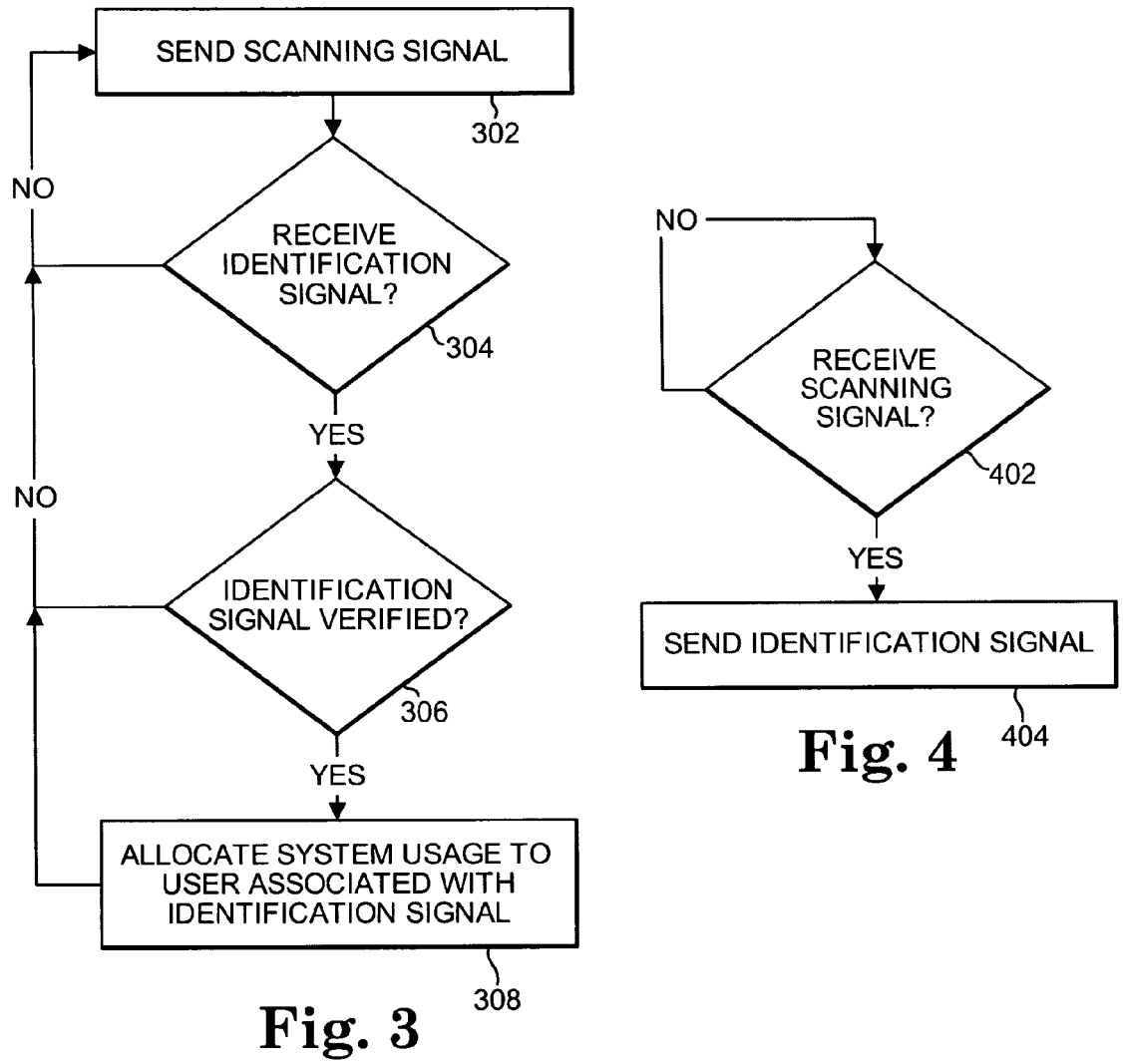
Fig. 3
Fig. 4

| 502 | 504 | 506 |
|---|---|---|
| IDENTIFICATION INFORMATION | USER IDENTIFIER | USER INFORMATION |
|  |  |  |
| . . . | . . . | . . . |
|  |  |  |

| 602 | 604 |
|---|---|
| USER IDENTIFIER | USAGE DETAILS |
|  |  |
| . . . | . . . |
|  |  |

TRACKING USAGE OF A FUNCTIONAL UNIT

BACKGROUND

In workgroup environments, it is often desirable to allocate the costs of shared resources, such as image forming systems. One way to allocate the costs is to track the usage of a resource and allocate the costs of the resource based on the amount of usage by different users. Unfortunately, tracking the usage of the resource may be cumbersome and may reduce the productivity of the users of the resource. For example, users may manually enter or write down usage information to assist in tracking usage.

BRIEF DESCRIPTION OF THE DRAWINGS

FIG. 2 is a block diagram illustrating an embodiment of an identification unit according to one embodiment of the present disclosure.

FIG. 3 is a flow chart illustrating an embodiment of a method for tracking usage of an image forming system according to one embodiment of the present disclosure.

FIG. 4 is a flow chart illustrating an embodiment of a method for providing an identification signal to an image forming system according to one embodiment of the present disclosure.

FIG. 5 is a block diagram illustrating an embodiment of a user list according to one embodiment of the present disclosure.

FIG. 6 is a block diagram illustrating an embodiment of usage information according to one embodiment of the present disclosure.

DETAILED DESCRIPTION

Figure 1:
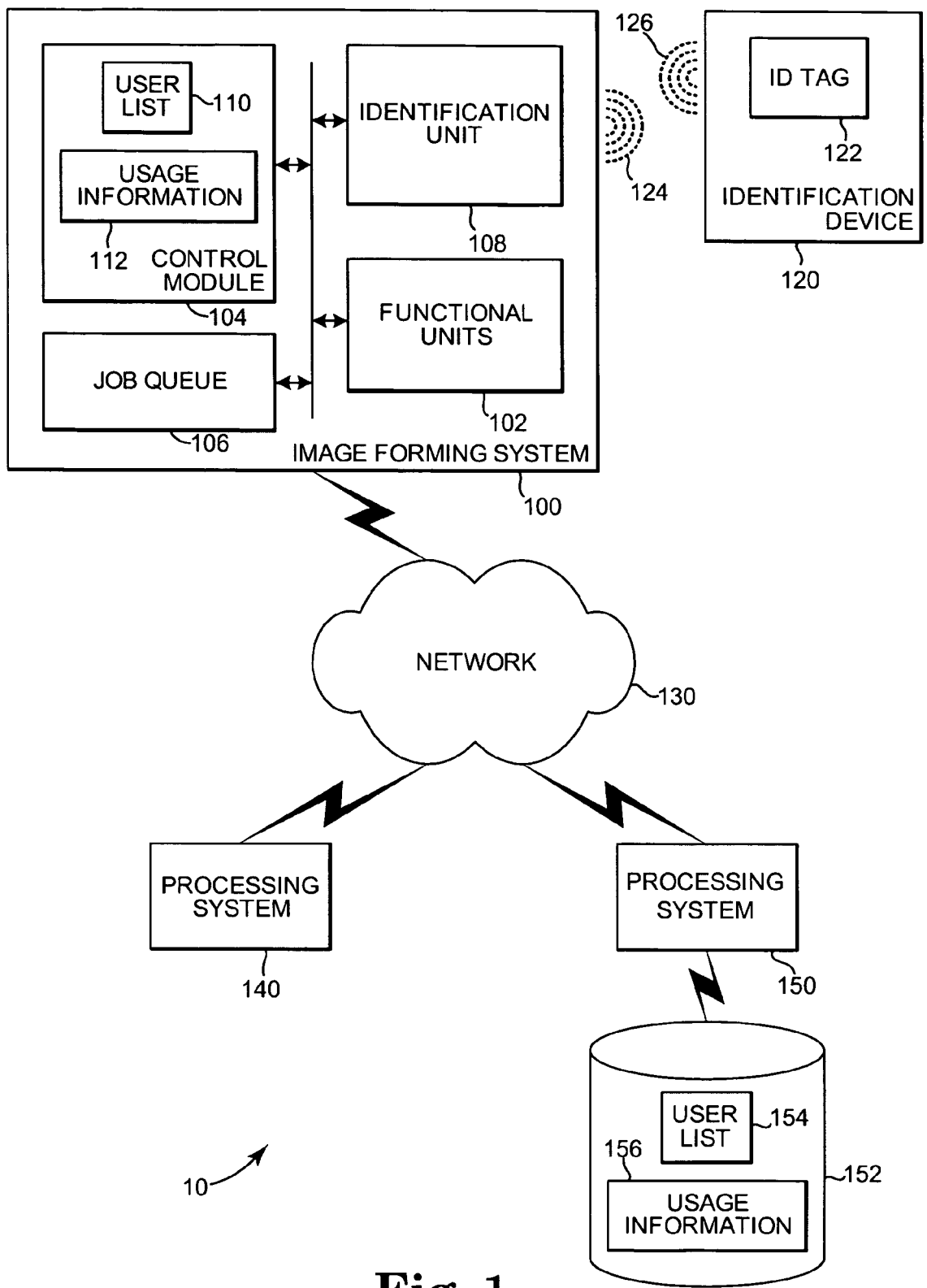
FIG. 1 is a block diagram illustrating an embodiment of a system for tracking usage of an image forming system according to one embodiment of the present disclosure.

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

FIG. 1 is a block diagram illustrating one embodiment of a system 10 for tracking usage of an image forming system 100. Image forming system 100 includes one or more functional units 102, a control module 104, a job queue 106, and an identification unit 108.

Functional units 102 comprise one or more image forming devices such as a printer, a scanner, a facsimile device, and/or a copier integrated into a common housing (not shown). The image forming devices may be configured to print, scan, fax, copy, and/or otherwise transfer images from one media to another. Each image forming device may comprise a color or monochrome device.

Control module 104 comprises any suitable combination of hardware and software components configured to control the operation of functional units 102, job queue 106, and identification unit 108. In one embodiment, control module 104 comprises firmware (not shown) executable by a processor (not shown) to perform the functions of control module 104 described herein. The firmware may be stored in any suitable media accessible to the processor and may be stored on a media external to image forming system 100 prior to being stored in image forming system 100.

Job queue 106 comprises storage space for storing jobs associated with one or more functional units 102. The jobs are received from one or more users of image forming system 100.

As shown in the embodiment of FIG. 2, identification unit 108 comprises a transceiver 202, a scanning antenna 204, and an interface 206 for communicating with control module 104. Responsive to control signals from control module 104, transceiver 202 causes scanning antenna 204 to broadcast a wireless scanning signal 124 during operation in a range of detection (e.g., one to two feet) relative to image forming system 100. Transceiver 202 receives a wireless identification signal 126 from an identification device 120 that is within the range of detection and provides information from identification signal 126 to control module 104 using interface 206. Interface 206 may comprise an internal connection to control module 104 or an external port connection controlled by control module 104.

Image forming system 100 communicates with identification device 120 to track the use of image forming system 100 by one or more users. Image forming system 100 communicates with identification device 120 by sending scanning signal 124 and receiving identification signal 126. More particularly, in one embodiment, identification unit 108 generates and sends scanning signal 124 over a field of detection during operation. An identification (ID) tag 122 within the field of detection receives scanning signal 124, and scanning signal 124 causes ID tag 122 to be activated. In response to being activated, ID tag 122 generates and sends identification signal 126 which includes information that identifies identification device 120. Identification unit 108 identifies identification device 120 using the information from identification signal 126 and associates identification device 120 with a user of image forming system 100 using information in a user list 110. Identification unit 108 then monitors the use of image forming system 100 by the user and records information that identifies the use in usage information 112.

Identification device 120 comprises any suitable housing or mounting apparatus for ID tag 122. Examples of identification device 120 include an identification card, a badge, a wrist band, an implanted chip, and a security badge. In one embodiment, ID tag 122 comprises a passive radio frequency identification (RFID) tag that is activated using the energy from scanning signal 124. In another embodiment, ID tag 122 comprises an active RFID tag that includes a battery to enable longer range transmissions of identification signal 126 in response to receiving scanning signal 124. In other embodiments, ID tag 122 comprises another type of tag configured to transmit identification signal 126 in response to detecting scanning signal 124.

Additional details of the operation of image forming system 100 and identification device 120 will now be described with reference to the methods of FIGS. 3 and 4, respectively.

FIG. 3 is a flow chart illustrating one embodiment of a method for tracking usage of image forming system 100. In FIG. 3, image forming system 100 sends scanning signal 124 as indicated in a block 302. More particularly, in one embodiment, scanning antenna 204 in identification unit 108 transmits scanning signal 124 over a field of detection during operation.

A determination is made by image forming system 100 as to whether identification signal 126 is received as indicated in a block 304. Identification unit 108 detects and receives identification signal 126 in response to identification device 120 entering the field of detection.

FIG. 4 is a flow chart illustrating one embodiment of a method for providing identification signal 126 to image forming system 100. In FIG. 4, a determination is made by identification device 120 as to whether scanning signal 124 is received as indicated in a block 402. Identification device 120 detects and receives scanning signal 124 in response to being moved by a user into the field of detection of identification unit 108. If scanning signal 124 is not received, then identification device 120 remains inactive until scanning signal 124 is received.

If scanning signal 124 is received, then ID tag 122 sends identification signal 126 as indicated in a block 404. As noted above, in one embodiment, ID tag 122 receives scanning signal 124 and uses the energy from scanning signal 124 to generate and transmit identification signal 126 in one embodiment. In another embodiment, ID tag 122 generates and transmits identification signal 126 using power from a battery or other power source (not shown) in response to receiving scanning signal 124.

Referring back to the embodiment of FIG. 3, if identification signal 126 is not received at block 304, then image forming system 100 continues the function of block 302. If identification signal 126 is received, then image forming system 100 determines whether identification signal 126 is verified by detecting whether identification signal 126 is associated with an authorized user of image forming system 100 as indicated in a block 306. In one embodiment, transceiver 202 provides information from identification signal 126 to control module 104. Control module 104 compares the information to user list 110 to verify an authorized user.

FIG. 5 is a block diagram illustrating an embodiment of user list 110. User list 110 includes an identification information field 502, a user identifier field 504, and a user information field 506 for each authorized user of image forming system 100. Control module 104 accesses identification information field 502, user identifier field 504, and user information field 506 to determine whether a user is verified.

Identification information field 502 includes information associated with ID tag 122. For example, in embodiments where ID tag 122 transmits a unique number as part of the information in identification signal 126, identification information field 502 includes this unique number.

User identifier field 504 includes information associated with a user to allow the user to be identified where the user may be a person or an entity such as a business unit or department. The information may include a user's name, employee number, group identifier, or other information that allows a user to be identified.

User information field 506 includes parameters that define a user's ability to use image forming system 100. The parameters indicate whether a user is an authorized user. The parameters may also define a user's ability to use features of image forming system 100. For example, the parameters may be programmed to cause image forming system 100 to operate according to predefined settings of functional units 102, e.g., print resolution or performance settings, associated with a specific user. The parameters may also be programmed to cause image forming system 100 to restrict a user's usage of image forming system, e.g., restrict the number or type of jobs a particular user may perform or limit a user's use of image forming system 100 to particular times.

Referring back to the embodiment of FIG. 3, if the information in identification signal 126 identifies an authorized user in user list 110, then control module 104 verifies identification signal 126 at block 306. If the information does not identify an authorized user in user list 110, then control module 104 does not verify identification signal 126. If identification signal 126 is not verified, then image forming system 100 continues the function of block 302. Control module 104 may inhibit operation of one or more of function units 102 if identification signal 126 is not verified.

If identification signal 126 is verified at block 306, then image forming system 100 allocates system usage to a user associated with identification signal 126 as indicated in a block 308. In one embodiment, control module 104 allows operation of one or more of function units 102 if identification signal 126 is verified and tracks the usage of function units 102 by the user by storing information associated with the usage in usage information 112. As noted above, the use of image forming system 100 may be limited by the parameters in user information field 506.

FIG. 6 is a block diagram illustrating one embodiment of usage information 112. In FIG. 6, usage information 112 includes a user identifier field 602 and a usage details field 604. Control module 104 stores information in user identifier field 602 and usage details field 604 to track the usage of image forming system 100 by each user.

User identifier field 602 includes information that identifies a user. The information may be the same as or similar to the information in user identifier field 504. Usage details field 604 includes information that identifies the type and amount of usage of one or more of functional units 102 by a user. For example, the information may indicate that a user printed one-hundred color pages at a resolution of 600 dots per inch on Feb. 20, 2005 at 9 AM.

After image forming system 100 verifies a user, the user may select jobs stored in job queue to be performed by one or more of functional units 102, e.g., printing or faxing a stored job. In addition, the user may operate one or more of functional units 102 directly, e.g., by copying, scanning, or faxing media provided by the user.

In one embodiment, image forming system 100 allows an amount of usage by a user up to a predetermined number of copies and/or prints and/or faxes and/or other operations performed by image forming system 100. In this embodiment, image forming system 100 may not allow a user to use one or more of functional units 102 of image forming system 100 in response to an amount of use being exceeded.

In one embodiment, image forming system 100 allows the user to use image forming system 100 and allocates the use of image forming system 100 to the user until ID tag 122 is removed from the field of detection of identification unit 108. In another embodiment, image forming system 100 allows the user to use image forming system 100 and allocates the use of image forming system 100 to the user identified by ID tag 122 for a predefined time, e.g., 10 minutes, after ID tag 122 is removed from the field of detection of identification unit 108. In a further embodiment, image forming system 100 allows the user to use image forming system 100 and allocates the use of image forming system 100 to the user identified by ID tag 122 until another ID tag (not shown) enters the field of detection and is verified.

In one embodiment, image forming system 100 selects one of multiple ID tags (not shown) in the field of detection according to prioritization information. In another embodiment, image forming system 100 detects multiple ID tags in the field of detection during processing of a job and proportionately allocates the use of image forming system 100 to the users identified by the ID tags. Image forming system 100 may allocate the use between the users according predefined allocation information.

In one embodiment, as illustrated in the embodiment of FIG. 1, image forming system 100 optionally couples to a network 130. Network 130 may be any type of wired or wireless network configured to allow image forming system 100 to communicate with any number and type of other systems or devices connected to network 130. In the example shown in FIG. 1, image forming system 100 communicates with processing system 140, processing system 150, and database 152 using network 130. Processing systems 140 and 150 may each be any type of information handling device configured to send information to and/or receive information from image forming system 100. Examples of such processing systems include a desktop or mobile computer system, a server, a database controller, a personal digital assistant (PDA), a mobile telephone, and an audio and/or video player.

In one embodiment, a user provides a job to image forming system 100 using processing system 140. Image forming system 100 receives the job from processing system 140 using network 130 and stores the job in job queue 106. To complete the job using one or more functional units 102, the user positions identification device 120 in the field of detection of identification unit 104 and selects the job for use by the one or more functional units 102 using an input/output device (not shown) of image forming system 100. For example, the user may select the job for printing by a functional unit 102 configured to print.

In one embodiment, image forming system 100 includes an input/output device (not shown) to allow a user to input the information in user list 110 shown in the embodiment of FIG. 5 for each authorized user of image forming system 100 to create user list 110. The user may also modify the information in user list 110 using the input/output device. In another embodiment, a user operates processing system 140 or another remote system (not shown) to create and modify user list 110 on image forming system 100. For example, processing system 140 may execute a driver (not shown) of image forming system 100 such that the user inputs the information in user list 110 shown in the embodiment of FIG. 5 for each authorized user of image forming system 100 to create user list 110. The driver may also allow the user to modify the information in user list 110.

In one embodiment, image forming system 100 includes an input/output device (not shown) to allow a user to access the information in usage information 112 shown in the embodiment of FIG. 6. Image forming system 100 may also provide the user with the ability to transfer usage information 112 to a hard copy (e.g., print usage information 112) or an electronic copy (e.g., e-mail usage information 112 or provide usage information 112 to an accounting system). In another embodiment, a user operates processing system 140 or another remote system (not shown) to access the information in usage information 112 from image forming system 100. Processing system 140 may display usage information 112 or cause usage information 112 to be stored on processing system 140 or transmitted to another system (not shown).

In one embodiment, control module 104 accesses user list 154 from remote database 152 to perform the verification of block 306 in the embodiment of FIG. 3. In this embodiment, user list 154 may include the fields shown in the embodiment of user list 110 in FIG. 5 and/or other information.

In one embodiment, control module 104 stores usage information 156 on remote database 152 to track the usage of image forming system 100 by each user of image forming system 100. In this embodiment, usage information 156 may include the fields shown in the embodiment of usage information 112 in FIG. 6 and/or other information.

In other embodiments, other image forming systems may be coupled to network 130. These image forming systems may be managed by processing systems 140 and/or 150 as described above with reference to image forming system 100.

The above system and methods may allow the usage of an image forming system to be more easily tracked by using an identification unit and identification devices. In addition, an image forming system may be secured from unauthorized use. Further, costs of sharing an image forming system between users may be accurately allocated.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the optical, mechanical, electromechanical, electrical, and computer arts will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited only by the claims and the equivalents thereof.

What is claimed is:

1. An image forming system comprising:
   means for receiving an identification signal from a first identification tag;
   means for identifying a user associated with the identification signal;
   means for monitoring usage of a plurality of functional units of the image forming system by the user subsequent to identifying the user;
   means for recording information that identifies the usage of the plurality of functional units by the user subsequent to identifying the user; and
   means for preventing the usage of one of the plurality of functional units by the user in response to a predetermined number of uses of the one of the plurality of functional units being exceeded.

2. The image forming system of claim 1 further comprising:
   means for verifying the user associated with the identification signal.

3. The image forming system of claim 1 wherein the first identification tag comprises a radio frequency identification (RFID) tag.

4. The image forming system of claim 1 further comprising:
   means for sending a scanning signal over a field of detection;
   wherein the first identification tag is configured to generate the identification signal using energy from the scanning signal.

5. The image forming system of claim 1 further comprising:
   means for accessing a job associated with the user for use with the one of the plurality of functional units; and
   wherein the information identifies the usage of the one of the plurality of functional units associated with the job.

6. The image forming system of claim 1 further comprising:
   means for allowing the usage of one of the plurality of functional units by the user until at least one of the following conditions is met: the first identification tag is outside of a field of detection of the means for receiving, a predetermined time has elapsed, and a second identification tag enters the field of detection of the means for receiving.

7. A method, comprising:
receiving an identification signal from an identification tag;
identifying a user associated with the identification signal;
monitoring usage of a plurality of functional units by the user subsequent identifying the user;
recording information that identifies the usage of the plurality of functional units by the user subsequent to identifying the user; and
preventing the usage of one of the plurality of functional units by the user for at least a first type of job.

8. The method of claim 7 further comprising:
verifying the user associated with the identification signal.

9. The method of claim 7 wherein the identification tag comprises a radio frequency identification (RFID) tag.

10. The method of claim 7 further comprising:
sending a scanning signal over a field of detection;
wherein the identification tag is configured to generate the identification signal using energy from the scanning signal.

11. The method of claim 7 further comprising:
accessing a second type of job associated with the user for use with the one of the plurality of functional units; and
wherein the information identifies the usage of the one of the plurality of functional units associated with the second type of job.

12. An image forming system comprising:
a plurality of functional units;
a control module coupled to the plurality of functional units; and
an identification unit configured to receive an identification signal from an identification tag;
wherein the identification unit is configured to provide first information associated with the identification signal to the control module, wherein the control module is configured to identify a user using the first information, wherein the control module is configured to monitor usage of the plurality of functional units by the user subsequent to identifying the user, wherein the control module is configured to record second information that identifies the usage of the plurality of functional units by the user subsequent to identifying the user, and wherein the control module is configured to prevent the usage of at least one of the plurality of functional units by the user during predefined times.

13. The image forming system of claim 12 wherein the control module is configured to verify the user associated with the first information using a user list.

14. The image forming system of claim 12 wherein the identification tag comprises a radio frequency identification (RFID) tag.

15. The image forming system of claim 12 wherein the identification unit is configured to send a scanning signal over a field of detection, and wherein the identification tag is configured to generate the identification signal using energy from the scanning signal.

16. The image forming system of claim 12 wherein the control module is configured to access a job associated with the user for use with the one of the plurality of functional units in response to a selection from the user, and wherein the second information identifies the usage of the one of the plurality of functional units associated with the job.

17. A system comprising:
a control module; and
an identification unit for receiving a first identification signal from a first identification tag and a second identification signal from a second identification tag and for providing first information associated with the first identification signal and second information associated with the second identification signal to the control module, with the control module for identifying a first user using the first information and a second user using the second information, for monitoring simultaneous usage of a plurality of functional units by the first user and the second user subsequent to identifying the first user and the second user, and for recording third information that identifies the simultaneous usage of the plurality of functional units by the first user and the second user subsequent to identifying the first user and the second user;
wherein the third information includes an allocation of the simultaneous usage between the first user and the second user in accordance with predefined allocation information.

18. The system of claim 17 wherein the control module is for verifying the first user associated with the first information and the second user associated with the second information using a user list.

19. The system of claim 17 wherein the first identification tag comprises a first radio frequency identification (RFID) tag, and wherein the second identification tag comprises a second RFID tag.

20. The system of claim 17 wherein the identification unit is for sending a scanning signal over a field of detection, wherein the first identification tag is for generating the first identification signal using energy from the scanning signal, and wherein the second identification tag is for generating the second identification signal using energy from the scanning signal.

21. The system of claim 17 wherein the control module is for accessing a job associated with the first user and the second user for use with one of the plurality of functional units in response to a selection from the first user, and wherein the third information identifies the usage of the one of the plurality of functional units associated with the job.

22. The system of claim 17 wherein the control module is for storing the third information in a remote database and for accessing a user list from the remote database.

23. An apparatus comprising:
a control module coupled to a plurality of functional units of an image forming system; and
an identification unit configured to send a scanning signal over a field of detection and configured to receive a first identification signal from a first identification tag within the field of detection and a second identification signal from a second identification tag within the field of detection;
wherein the identification unit is configured to provide first information associated with the first identification signal and second information associated with the second identification signal to the control module, wherein the control module is configured to identify a first user using the first information and a second user using the second information, wherein the control module is configured to select the one of the first tag and the second tag according to prioritization information, wherein the control module is configured to monitor usage of the plurality of functional units of the image forming system by the first user in response to the first tag being selected and by the second user in response to the second tag being selected, and wherein the control module is configured to record third information that identifies the usage of the plurality of functional units by the first user in response to the first tag being selected and by the second user in response to the second tag being selected.

24. The apparatus of claim 23 wherein the control module is configured to verify the first user associated with the first information and the second user associated with the second information using a user list.

25. The apparatus of claim 23 wherein the identification tag comprises a first radio frequency identification (RFID) tag, and wherein the second identification tag comprises a second RFID tag.

26. The apparatus of claim 25 wherein the first identification tag is configured to generate the first identification signal using energy from the scanning signal, and wherein the second identification tag is for generating the second identification signal using energy from the scanning signal.

27. The apparatus of claim 23 wherein the control module is configured to access a job associated with the first user for use with one of the plurality of functional units in response to the first tag being selected, and wherein the third information identifies the usage of the one of the plurality of functional units associated with the job.

28. A computer readable medium having instructions for causing a computer to execute a method comprising:
    receiving an identification signal from an identification tag;
    identifying a user associated with the identification signal;
    monitoring usage of a plurality of functional units by the user subsequent to identifying the user;
    recording information that identifies the usage of the plurality of functional units by the user subsequent to identifying the user; and
    preventing the usage of one of the plurality of functional units by the user in response to a predetermined number of uses of the one of the plurality of functional units being exceeded.

29. The computer readable medium of claim 28 having instructions for causing the computer to execute the method comprising:
    verifying the user associated with the identification signal.

30. The computer readable medium of claim 28 wherein the identification tag comprises a radio frequency identification (RFID) tag.

31. The computer readable medium of claim 28 having instructions for causing the computer to execute the method comprising:
    sending a scanning signal over a field of detection;
    wherein the identification tag is configured to generate the identification signal using energy from the scanning signal.

32. The computer readable medium of claim 28 having instructions for causing the computer to execute the method comprising:
    accessing a job associated with the user for use with the one of the plurality of functional units; and
    wherein the information identifies the usage of the one of the plurality of functional units associated with the job.

* * * * *